(12) United States Patent
Deng et al.

(10) Patent No.: US 10,773,341 B2
(45) Date of Patent: Sep. 15, 2020

(54) WELDING SYSTEM AND METHOD

(71) Applicants: Tyco Electronics (Shanghai) Co. Ltd., Shanghai (CN); Measurement Specialities (Chengdu) Ltd, Shenzhen (CN); TE Connectivity Corporation, Berwyn, PA (US); Shenzhen AMI Technology Co., Ltd, Shenzhen (CN)

(72) Inventors: Yingcong Deng, Shanghai (CN); Lan Gong, Shenzhen (CN); Qian Ying, Shenzhen (CN); Dandan Zhang, Shanghai (CN); Lvhai Hu, Shanghai (CN); Yun Liu, Shanghai (CN); Qinglong Zeng, Guangdong (CN); Yong Yan, Shenzhen (CN); Roberto Francisco-Yi Lu, Shanghai (CN)

(73) Assignees: Tyco Electronics (Shanghai) Co., Ltd., Shanghai (CN); Measurement Specialities (Chengdai) Ltd, Shenzhen (CN); TE Connectivity Corporation, Berwyn, PA (US); Shenzhen AMI Technology Co., Ltd., Guangdong (CN)

( * ) Notice: Subject to any disclaimer, the term of this patent is extended or adjusted under 35 U.S.C. 154(b) by 390 days.

(21) Appl. No.: 15/611,020

(22) Filed: Jun. 1, 2017

(65) Prior Publication Data
US 2017/0348800 A1 Dec. 7, 2017

(30) Foreign Application Priority Data
Jun. 1, 2016 (CN) .......................... 2016 1 0380325

(51) Int. Cl.
*B23K 26/22* (2006.01)
*B23K 26/042* (2014.01)
*B23K 37/053* (2006.01)
*B23K 26/08* (2014.01)
*B23K 26/21* (2014.01)
*B23K 26/03* (2006.01)
*B23K 26/12* (2014.01)
(Continued)

(52) U.S. Cl.
CPC ............ *B23K 26/22* (2013.01); *B23K 26/032* (2013.01); *B23K 26/042* (2015.10); *B23K 26/0853* (2013.01); *B23K 26/123* (2013.01); *B23K 26/1435* (2013.01); *B23K 26/21* (2015.10); *B23K 37/0452* (2013.01); *B23K 37/053* (2013.01); *B23K 2101/32* (2018.08)

(58) Field of Classification Search
CPC ........ B23K 26/00; B23K 26/26; B23K 26/22; B23K 26/042; B23K 26/032; B23K 26/0853; B23K 26/60; B23K 26/21
USPC ... 219/56, 56.21, 56.22, 57, 58, 121.82, 138
See application file for complete search history.

(56) References Cited

U.S. PATENT DOCUMENTS

| | | | | |
|---|---|---|---|---|
| 3,036,204 A | * | 5/1962 | Stieglitz | B23K 11/046 219/101 |
| 4,049,414 A | * | 9/1977 | Smith | G02B 6/2551 65/407 |

(Continued)

*Primary Examiner* — Lorne E Meade
*Assistant Examiner* — Ayub A Maye

(57) ABSTRACT

A welding system for welding a first elongated element and a second elongated element together by a laser beam that is emitted from a laser welding head after the ideal welding center point of the aligned first and second elongated elements has been positioned at a focal point of the laser beam that is emitted from the laser welding head.

14 Claims, 4 Drawing Sheets

(51) Int. Cl.
 *B23K 26/14* (2014.01)
 *B23K 37/04* (2006.01)
 *B23K 101/32* (2006.01)

(56) References Cited

U.S. PATENT DOCUMENTS

| | | | | |
|---|---|---|---|---|
| 4,153,830 | A * | 5/1979 | Baba | B23K 11/318 |
| | | | | 219/101 |
| 4,626,647 | A * | 12/1986 | Takeda | B21B 15/0085 |
| | | | | 219/101 |
| 7,784,666 | B2 * | 8/2010 | Iimura | B23K 37/0461 |
| | | | | 219/101 |
| 8,653,418 | B2 * | 2/2014 | Kim | B23K 9/12 |
| | | | | 219/138 |
| 2004/0190838 | A1 * | 9/2004 | Bush | G01M 11/37 |
| | | | | 385/96 |
| 2005/0183460 | A1 * | 8/2005 | Takahara | G02B 6/2551 |
| | | | | 65/377 |
| 2011/0311812 | A1 * | 12/2011 | Haussmann | B23K 26/26 |
| | | | | 428/373 |
| 2015/0343548 | A1 * | 12/2015 | Skurkis | B23K 9/007 |
| | | | | 219/137 R |

\* cited by examiner

WELDING SYSTEM AND METHOD

CROSS-REFERENCE TO RELATED APPLICATION

This application claims the benefit of the filing date under 35 U.S.C. § 119(a)-(d) of Chinese Patent Application No. 201610380325.6 filed on Jun. 1, 2016.

FIELD OF THE INVENTION

The present invention relates to a welding system and method and, more particularly, to a welding system and method adapted to weld a first elongated element and a second elongated element together.

BACKGROUND

In the prior art, a pair of elongated elements, for example, a pair of elongated wires, generally are welded together manually. An operator holds the pair of elongated elements by hand. While viewing, the operator watches ends of the pair of elongated elements that are to be welded together with a microscope, the operator aligns the ends of the pair of elongated elements with each other. Then the operator turns on a laser welding head to weld the aligned ends of the pair of elongated elements together by a laser beam emitted from the laser welding head.

The step of manually aligning the pair of elongated elements reduces considerably the welding efficiency. In addition, the operator is exposed to injury by the laser beam. In addition, the quality of the weld might suffer because the manual alignment of the elongated wires lacks stability.

SUMMARY

A welding system, constructed in accordance with the present invention, comprises a laser welding head, a first fixture adapted to fix a first elongated element, a first moving mechanism, a second fixture adapted to fix a second elongated element, and a second moving mechanism. The first fixture, with the first elongated member affixed, is mounted upon the first moving mechanism and the first elongated element is moved into alignment with the second elongated element. The first moving mechanism and the second fixture are mounted on the second moving mechanism and the first moving mechanism and the second fixture are moved to a location at which the ideal welding center point of the aligned first elongated element and the second elongated elements is positioned at the focal point of a laser beam emitted from the laser welding head.

According to another aspect of the present invention, a method of welding a first elongated element to a second elongated element includes the step of providing a welding system that has a welding head, a first fixture adapted to fix a first elongated element, and a first moving mechanism upon which the first fixture is mounted and the first elongated element moved into alignment with a second elongated element. This welding system also has a second fixture adapted to fix the second elongated element and a second moving mechanism upon which the first moving mechanism and the second fixture are mounted and the first moving mechanism and the second fixture are moved to a location at which the ideal welding center point of the aligned first elongated element and the second elongated element is positioned at the focal point of a laser beam emitted from the laser welding head. This method of welding a first elongated element to a second elongated element also includes the steps of fixing the first elongated element and the second elongated element on the first fixture and the second fixture, respectively, moving the first fixture by the first moving mechanism until the first elongated element fixed on the first fixture is aligned with the second elongated element fixed on the second fixture. This method of welding a first elongated element to a second elongated element further includes the steps of moving the first moving mechanism and the second fixture by the second moving mechanism until an ideal welding center point of the aligned first and second elongated elements is accurately located at a focal point of the laser beam from the laser welding head and turning on the laser welding head to weld the first elongated element and the second elongated element together.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EMBODIMENT(S)

Figure 1:
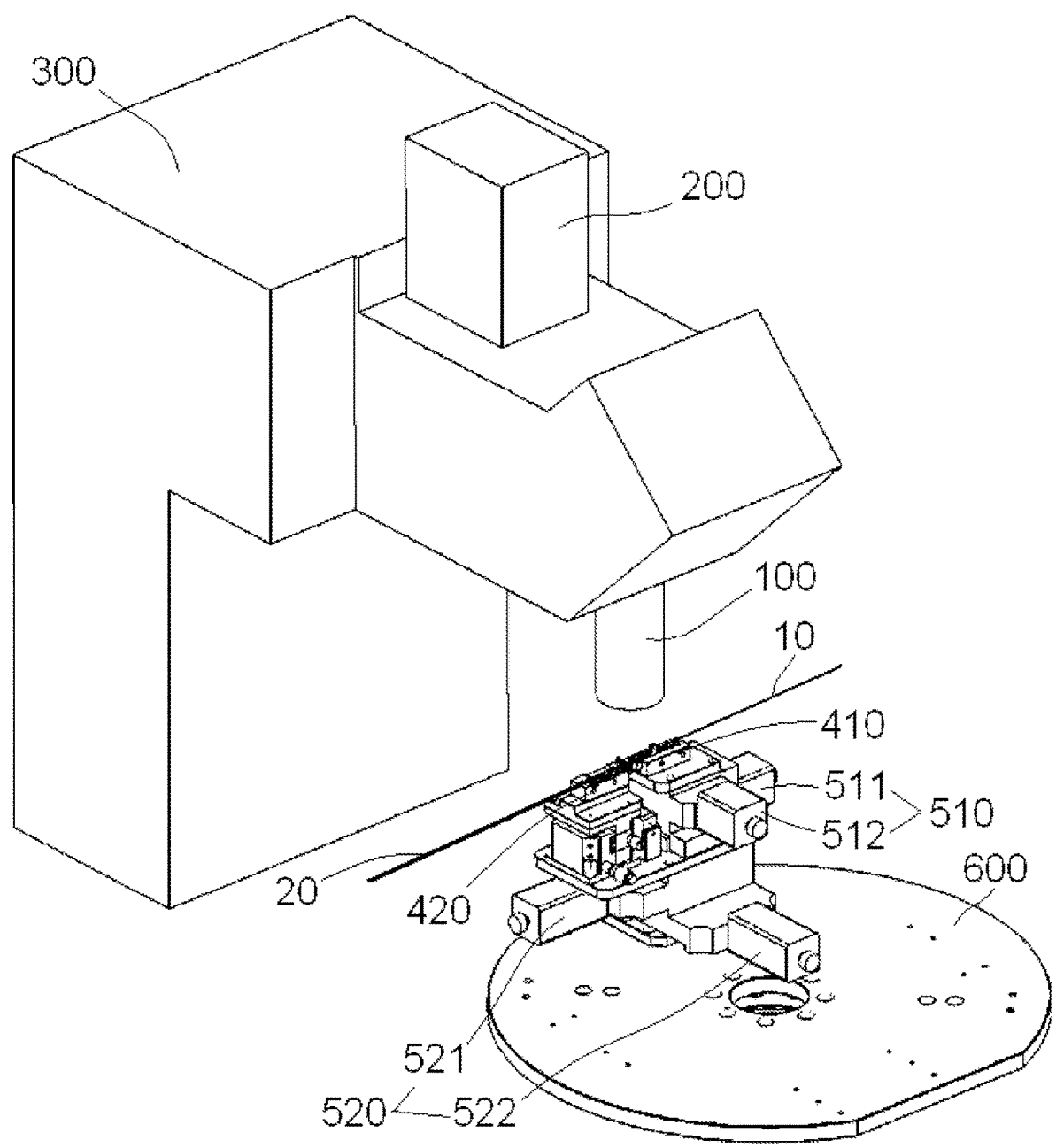
FIG. 1 is a perspective view of a welding system according to an exemplary embodiment of the present invention.

Exemplary embodiments of the present disclosure will be described hereinafter in detail with reference to the attached drawings, wherein like reference numerals refer to like elements. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
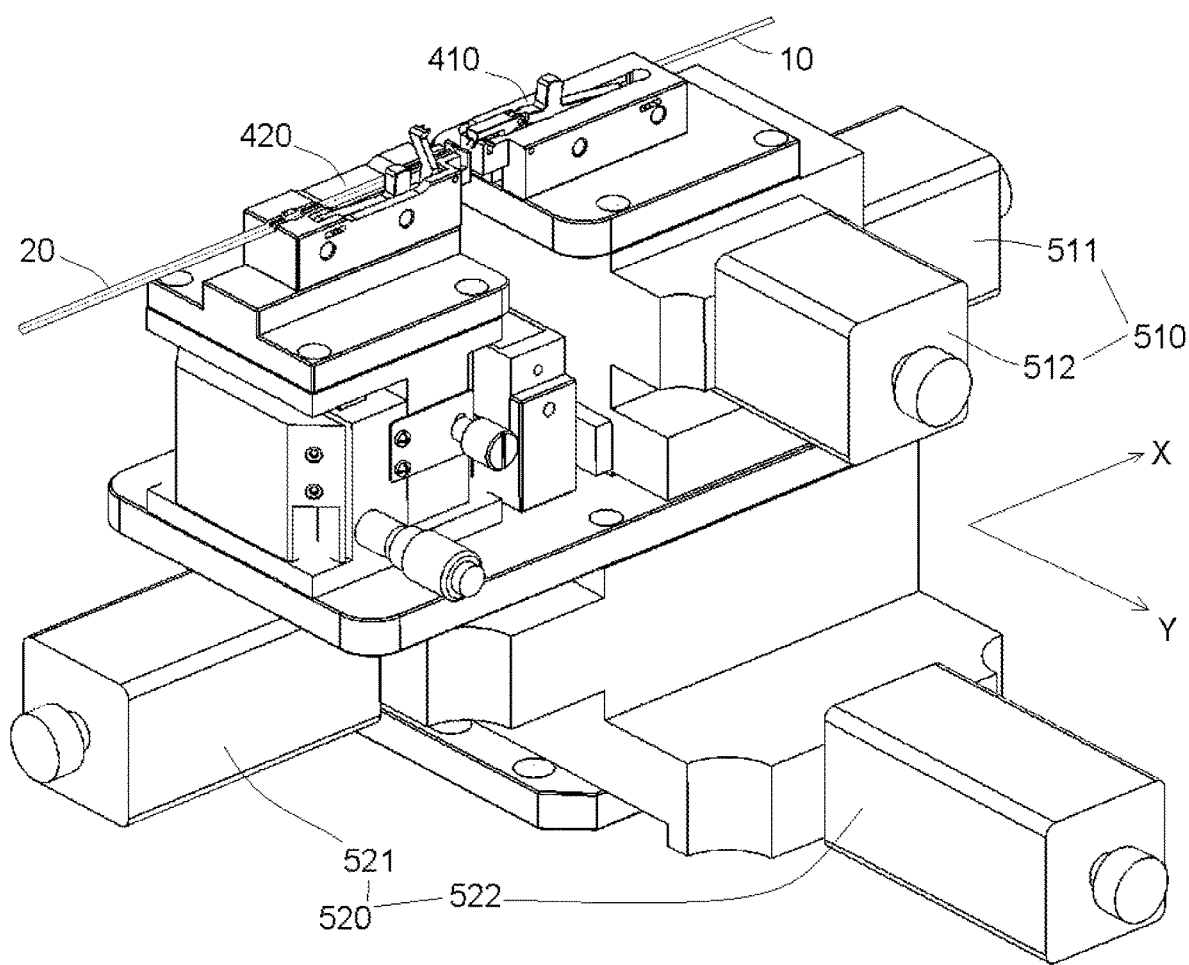
FIG. 2 shows, on an enlarged scale, a first fixture, a second fixture, a first moving mechanism, and a second moving mechanism of the welding system of FIG. 1.

FIG. 1 is a perspective view of a welding system according to an exemplary embodiment of the present invention and FIG. 2 shows a first fixture 410, a second fixture 420, a first moving mechanism 510, and a second moving mechanism 520 of the welding system of FIG. 1.

As shown in FIGS. 1 and 2, the welding system is used to weld a first elongated element 10, for example, a first wire, and a second elongated element 20, for example, a second wire, together.

Figure 3:
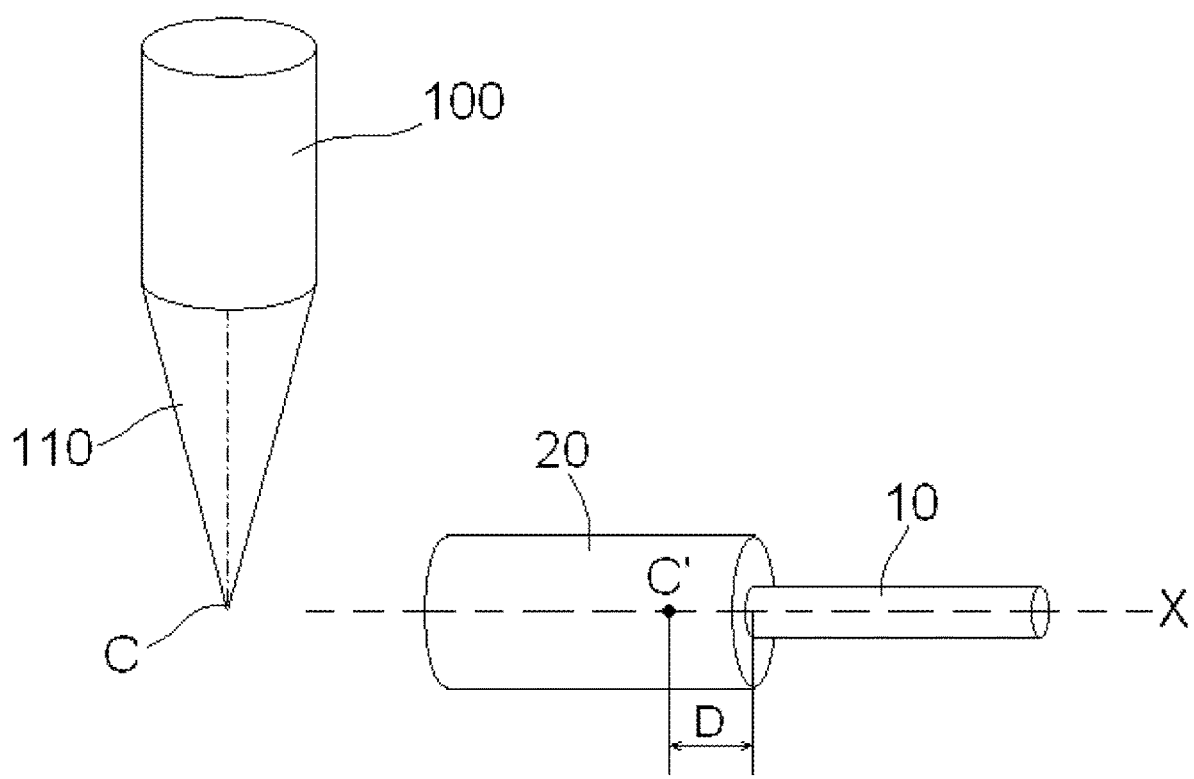
FIG. 3 shows a first elongated element, a second elongated element aligned with the first elongated element, and a laser welding head, in which an ideal welding center point of the aligned first and second elongated elements and a focal point of the laser beam are shown.
Figure 4:
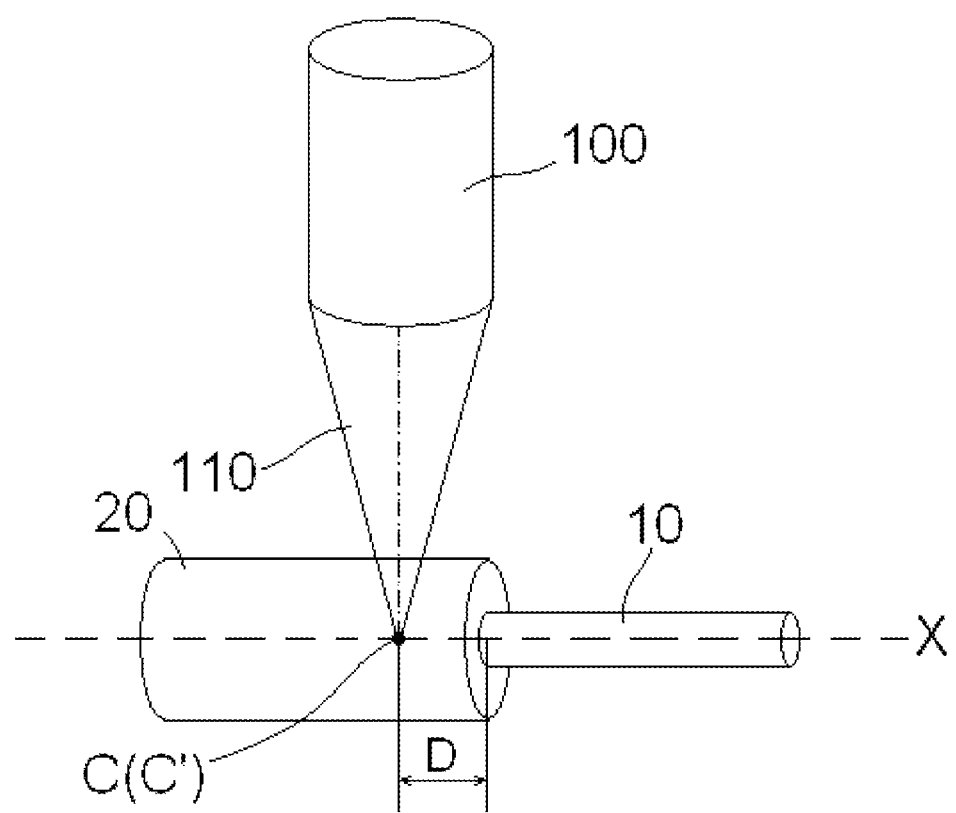
FIG. 4 shows the ideal welding center point of the aligned first and second elongated elements of FIG. 3 positioned at the focal point of the laser beam.

As shown in FIGS. 1 and 2, the welding system comprises: a first moving mechanism 510; a first fixture 410 adapted to fix the first elongated element 10; a second moving mechanism 520; a second fixture 420 adapted to fix the second elongated element 20; and a laser welding head 100 adapted to emit a laser beam 110 (see FIGS. 3 and 4).

As shown in FIGS. 1 and 2, the first fixture 410 is mounted on the first moving mechanism 510 and the first fixture 410 may be moved by the first moving mechanism 510, so that the first elongated element 10, fixed on the first fixture 410, may be aligned with the second elongated element 20 fixed on the second fixture 420.

FIG. 3 shows the first elongated element 10, the second elongated element 20 aligned with the first elongated element 10, and the laser welding head 100, in which an ideal welding center point C' of the aligned first and second elongated elements 10, 20 and a focal point C of the laser beam 110 are shown. FIG. 4 illustrates moving the ideal welding center point C' of the aligned first and second elongated elements 10, 20 of FIG. 3 to the focal point C of the laser beam 110.

As shown in FIGS. 1-4, the first moving mechanism 510 and the second fixture 420 are mounted on the second moving mechanism 520 and the second moving mechanism 520 moves the first moving mechanism 510 and the second fixture 420, which are mounted on the second moving mechanism 520, so that the ideal welding center point C' of the aligned first and second elongated elements 10, 20 is accurately positioned at the focal point C of the laser beam 110 that is emitted from the laser welding head 100 (see FIGS. 3 and 4).

As shown in FIGS. 1 and 2, the welding system may further comprise a vision device 200. The first moving mechanism 510 is adapted to move the first elongated element 10 fixed on the first fixture 410 under the guidance of the vision device 200 until the first elongated element 10 is aligned with the second elongated element 20. Thereby, the first elongated element 10 may be automatically moved to precisely align with the second elongated element 20 by the first moving mechanism 510 under the guidance of the vision device 200.

As shown in FIGS. 1-4, the second moving mechanism 520 moves the aligned first and second elongated elements 10, 20 under the guidance of the vision device 200 until the ideal welding center point C' of the aligned first and second elongated elements 10, 20 is accurately positioned at the focal point C of the laser beam 110 emitted from the laser welding head 100. Thus, the ideal welding center point C' of the aligned first and second elongated elements 10, 20 may be automatically and precisely moved to the focal point C of the laser beam 110 emitted from the laser welding head 100 by the second moving mechanism 520 under the guidance of the vision device 200 to enhance the welding quality.

As shown in FIGS. 3 and 4, after the first elongated element 10 is aligned with the second elongated element 20, the first elongated element 10 and the second elongated element 20 have a common center axis X and the end faces of the first elongated element 10 and the second elongated element 20 abut against each other.

In an exemplary embodiment of the present invention, the welding system may further comprise a protective gas injection device (not shown). The protective gas injection device is adapted to spray a protective gas to a welding area of the first elongated element 10 and the second elongated element 20 to protect the first elongated element 10 and the second elongated element 20 from being oxidized during welding the first elongated element 10 and the second elongated element 20 with the laser beam 110.

The protective gas injection device may be integrated into the laser welding head 100. In order to effectively protect the first elongated element 10 and the second elongated element 20, the protective gas injection device is turned on before turning on the laser welding head 100 and is turned off after turning off the laser welding head 100.

As shown in FIG. 1, the welding system may further comprise a controller 300 which is adapted to control the power of the laser beam 110 emitted from the laser welding head 100 and the flow of the protective gas sprayed from the protective gas injection device.

As shown in FIGS. 3 and 4, the first elongated element 10 has a diameter less than that of the second elongated element 20. As shown in FIG. 3, the ideal welding center point C' of the aligned first and second elongated elements 10, 20 is located in the second elongated element 20 and on the center axis of the second elongated element 20. As shown in FIG. 3, the ideal welding center point C' is distanced from the end face of the second elongated element 20 by a distance D. The distance D may be calculated based on the diameter of the first elongated element 10 and the diameter of the second elongated element 20. In practice, if the distance D is too large, the laser beam will be distanced from the first elongated element 10 too far and cannot melt the first elongated element 10. This will result in a welding failure. On the other hand, if the distance D is too small, the end to be welded of the first elongated element 10 may be completely melted by the laser beam. This also will result in welding failure. Thus, it is necessary to properly set the distance D so that the ends to be welded of the first elongated element 10 and the second elongated element 20 are partly melted by the laser beam and effectively welded together. Properly determining the ideal welding center point C' of the aligned first and second elongated elements 10, 20 is very important to ensure the welding quality.

In order to ensure the welding quality of the aligned first and second elongated elements 10, 20, it is necessary to accurately locate the ideal center point C' at the focal point (or referred to as the actual welding center point) C of the laser beam 110 emitted from the laser welding head 100. The ideal welding center point C' of the aligned first and second elongated elements 10, 20 is necessarily accurately moved to the focal point (the actual welding center point) C of the laser beam 110 emitted from the laser welding head 100.

As shown in FIGS. 1-4, the vision device 200 is adapted to identify the position of the ideal welding center point C' of the aligned first and second elongated elements 10, 20. The controller 300 is adapted to perform a closed-loop feedback control on the second moving mechanism 520 based on the identified position of the ideal welding center point C' until the ideal welding center point C' of the aligned first and second elongated elements 10, 20 is accurately moved to the focal point (the actual welding center point) C of the laser beam 110 emitted from the laser welding head 100, that is, until a position error between the ideal welding center point C' of the aligned first and second elongated elements 10, 20 and the focal point C of the laser beam 110 becomes zero.

As shown in FIGS. 1 and 2, the first moving mechanism 510 has a moving platform adapted to move in a first direction X and a second direction Y perpendicular to the first direction X in a horizontal plane. The first moving mechanism 510 comprises a first moving platform 511 adapted to move in the first direction X and a second moving platform 512 mounted on the first moving platform 511 and adapted to move in the second direction Y. The first fixture 410 is mounted on the second moving platform 512 of the first moving mechanism 510.

As shown in FIGS. 1 and 2, the second moving mechanism 520 has a moving platform adapted to move in the first direction X and the second direction Y in the horizontal plane. The second moving mechanism 520 comprises a first moving platform 521 adapted to move in the first direction X and a second moving platform 522 adapted to move in the second direction Y. The second moving platform 522 of the second moving mechanism 520 is mounted on a base 600. The first moving platform 521 of the second moving mechanism 520 is mounted on the second moving platform 522 of the second moving mechanism 520. The first moving mechanism 510 and the second fixture 420 are mounted on the first moving platform 521 of the second moving mechanism 520.

As shown in FIGS. 1-4, the first elongated element 10 is different from the second elongated element 20 in diameter. This indicates that the first fixture 410 and the second fixture 420 are adapted to fix different types and sizes of elongated elements.

The first fixture 410 and the second fixture 420 can be arranged to fix together a plurality of first elongated elements 10 and second elongated elements 20 at the same time. In this way, the first moving mechanism 410 may be used to simultaneously realize the alignment of the plurality of first elongated elements 10 and the plurality of elongated elements 20, thereby further improving the welding efficiency.

In the illustrated embodiment of the present invention, the first moving mechanism 510 and the second moving mechanism 520 each is configured to be a moving platform adapted to move in the first direction X and the second direction Y perpendicular to the first direction X in the horizontal plane. But the present invention is not limited to this construction. For example, the first moving mechanism 510 and/or the second moving mechanism 520 may comprise a robot having at least two freedoms.

In another exemplary embodiment of the present invention, a method of welding a first elongated element 10 to a second elongated element 20 comprises steps of:

S100: providing the above welding system as shown in FIGS. 1-4;

S200: fixing the first elongated element 10 and the second elongated element 20 on the first fixture 410 and the second fixture 420, respectively;

S300: moving the first fixture 410 by the first moving mechanism 510 until the first elongated element 10 fixed on the first fixture 410 is aligned with the second elongated element 20 fixed on the second fixture 420;

S400: moving the first moving mechanism 510 and the second fixture 420 by the second moving mechanism 520 until an ideal welding center point C' of the aligned first and second elongated elements 10, 20 is accurately located at a focal point C of the laser beam 110 from the laser welding head 100; and S500: turning on the laser welding head 100 to weld the first elongated element 10 and the second elongated element 20 together.

This method may further include the step of spraying a protective gas to a welding area of the first elongated element 10 and the second elongated element 20 before turning on the laser welding head 100 to protect the first elongated element 10 and the second elongated element 20 from being oxidized during welding.

It should be appreciated for those skilled in this art that the above embodiments are intended to be illustrative and not restrictive. For example, many modifications may be made to the above embodiments by those skilled in this art and various features described in different embodiments may be freely combined with each other without conflicting in configuration or principle.

Although several exemplary embodiments have been shown and described, it will be appreciated by those skilled in the art that various changes or modifications may be made in these embodiments without departing from the principles and spirit of the present invention, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A welding system comprising:
    a laser welding head;
    a first fixture adapted to fix a first elongated element;
    a first moving mechanism upon which the first fixture is mounted and the first elongated element is moved into alignment with a second elongated element, the first moving mechanism comprising:
        a first moving platform that moves in a first horizontal direction; and
        a second moving platform mounted on the first moving platform that moves in a second horizontal direction, perpendicular to the first horizontal direction, wherein the first fixture is mounted on the second moving platform of the first moving mechanism;
    a second fixture adapted to fix the second elongated element; and
    a second moving mechanism upon which the first moving mechanism and the second fixture are mounted and the first moving mechanism and the second fixture are moved to a location at which the ideal welding center point of the aligned first elongated element and the second elongated elements is positioned at the focal point of a laser beam emitted from the laser welding head, the second moving mechanism comprising:
        a first moving platform that moves in the first horizontal direction; and
        a second moving platform that moves in the second horizontal direction, wherein the second moving platform of the second moving mechanism is mounted on a base and the first moving platform of the second moving mechanism is mounted on the second moving platform of the second moving mechanism, and wherein the first moving mechanism and the second fixture are mounted on the first moving platform of the second moving mechanism.

2. The welding system according to claim 1:
    (a) further comprising a vision device, and
    (b) wherein the first moving mechanism moves the first elongated element fixed on the first fixture in response to the vision device until the first elongated element is aligned with the second elongated element.

3. The welding system according to claim 2, wherein the second moving mechanism moves the aligned first and second elongated elements in response to the vision device until the ideal welding center point of the aligned first and second elongated elements is located at the focal point of the laser beam from the laser welding head.

4. The welding system according to claim 2, further comprising a protective gas injection device that sprays a protective gas to a welding area of the first elongated element and the second elongated element, thereby protecting the first elongated element and the second elongated element from being oxidized during welding the first elongated element and the second elongated element with the laser beam.

5. The welding system according to claim 4, wherein the protective gas injection device is turned on before turning on the laser welding head and is turned off after turning off the laser welding head.

6. The welding system according to claim 4, further comprising a controller controlling the power of the laser beam emitted from the laser welding head and the flow of the protective gas sprayed from the protective gas injection device.

7. The welding system according to claim 6, wherein:
(a) the vision device identifies the position of the ideal welding center point of the aligned first and second elongated elements, and
(b) the controller performs a closed-loop feedback control on the second moving mechanism based on the identified position of the ideal welding center point until a position error between the ideal welding center point and the focal point of the laser beam becomes zero.

8. The welding system according to claim 1, wherein, after being aligned with each other, the first elongated element and the second elongated element have a common center axis and end faces of the first elongated element and the second elongated element abut against each other.

9. The welding system according to claim 1, wherein the first fixture and the second fixture are adapted to fix different types of elongated elements.

10. The welding system according to claim 1, wherein the first fixture is adapted to fix a plurality of first elongated elements at the same time and the second fixture is adapted to fix a plurality of second elongated elements at the same time.

11. The welding system according to claim 1, wherein the first elongated element and the second elongated element each is a wire.

12. The welding system according to claim 1, wherein at least one of the first moving mechanism and the second moving mechanism is a robot having at least two freedoms.

13. A method for welding a first elongated element to a second elongated element comprising steps of:
providing a welding system comprising:
(a) a laser welding head,
(b) a first fixture adapted to fix a first elongated element,
(c) a first moving mechanism upon which the first fixture is mounted and the first elongated element is moved into alignment with a second elongated element, the first moving mechanism comprising:
a first moving platform that moves in a first horizontal direction; and
a second moving platform mounted on the first moving platform that moves in a second horizontal direction, perpendicular to the first horizontal direction, wherein the first fixture is mounted on the second moving platform of the first moving mechanism,
(d) a second fixture adapted to fix the second elongated element, and
(e) a second moving mechanism upon which the first moving mechanism and the second fixture are mounted and the first moving mechanism and the second fixture are moved to a location at which the ideal welding center point of the aligned first elongated element and the second elongated elements is positioned at the focal point of a laser beam emitted from the laser welding head, the second moving mechanism comprising:
a first moving platform that moves in the first horizontal direction; and
a second moving platform that moves in the second horizontal direction, wherein the second moving platform of the second moving mechanism is mounted on a base and the first moving platform of the second moving mechanism is mounted on the second moving platform of the second moving mechanism, and wherein the first moving mechanism and the second fixture are mounted on the first moving platform of the second moving mechanism;
fixing the first elongated element and the second elongated element on the first fixture and the second fixture, respectively;
moving the first fixture by the first moving mechanism until the first elongated element fixed on the first fixture is aligned with the second elongated element fixed on the second fixture;
moving the first moving mechanism and the second fixture by the second moving mechanism until an ideal welding center point of the aligned first and second elongated elements is accurately located at a focal point of the laser beam emitted from the laser welding head; and
turning on the laser welding head to weld the first elongated element and the second elongated element together.

14. The method according to claim 13, further comprising a step of spraying a protective gas to a welding area of the first elongated element and the second elongated element before turning on the laser welding head to protect the first elongated element and the second elongated element from being oxidized during welding.

* * * * *